June 13, 1944.  H. M. SCHICK  2,351,152
AIRPLANE BODY CONSTRUCTION
Filed Aug. 23, 1940  2 Sheets-Sheet 1

INVENTOR,
Herbert M Schick
BY
A. Schapp
ATTORNEY.

June 13, 1944.   H. M. SCHICK   2,351,152
AIRPLANE BODY CONSTRUCTION
Filed Aug. 23, 1940   2 Sheets-Sheet 2
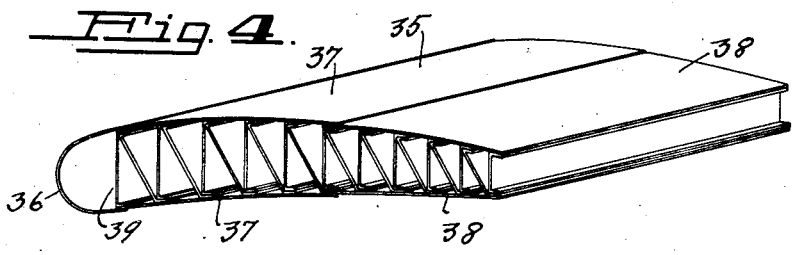
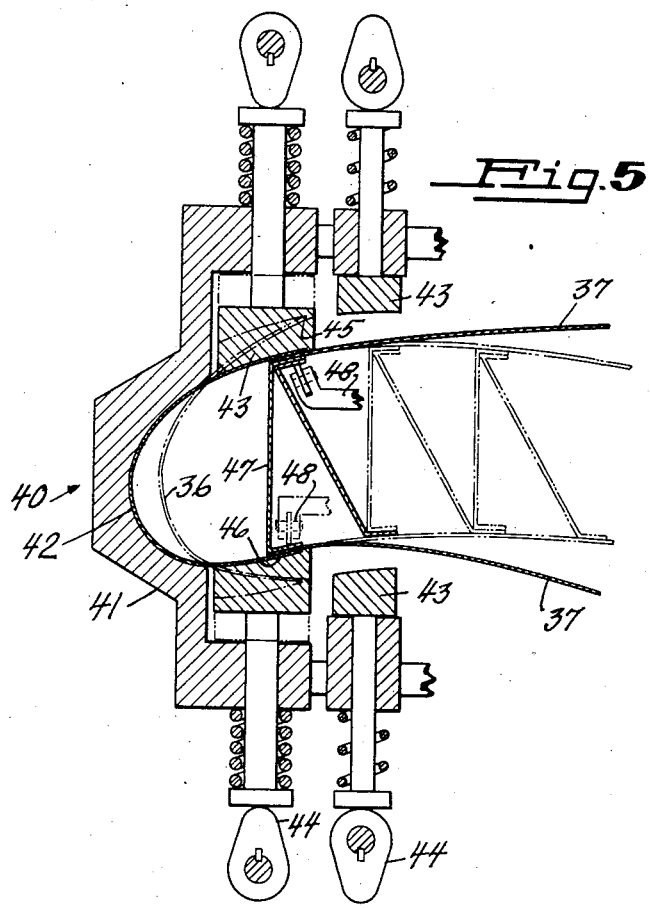
INVENTOR,
Herbert M. Schick
BY
A. Schapp
ATTORNEY.

Patented June 13, 1944

2,351,152

UNITED STATES PATENT OFFICE 2,351,152

AIRPLANE BODY CONSTRUCTION

Herbert M. Schick, San Francisco, Calif.

Application August 23, 1940, Serial No. 353,847

9 Claims. (Cl. 219—10)

The present invention relates to improvements in airplane body construction, and its principal object is to provide a novel body structure and a method for making the same with a view of reducing the hours of labor in the manufacture of airplane bodies and of allowing the same to be manufactured at increased speed and greater economy.

A further object of my invention is to provide an airplane construction of greater strength for the weight of the material used, and to thereby increase the efficiency of such body.

A still further object of the invention is to provide a method of manufacture for airplane bodies whereby the latter are made in one continuous process with the aid of suitable machinery with manual labor substantially eliminated.

Another object of the invention is to provide a method of making an airplane which is uniform in strength and in its makeup throughout the length thereof, the human element in assembling and riveting operations being entirely absent, and there is no danger of localized sections being weaker than others, due to faulty workmanship.

I further propose to provide an airplane body in which the frame structure, as well as the shell structure, is made continuous, so that the completed body really consists of two continuous sections, one disposed within the other and serving as a frame for the latter.

More particularly it is proposed to form an airplane body against a mandrel of suitable shape, to provide novel means for rendering the body material sufficiently ductile for forming upon the mandrel and to provide a novel method of welding the seams electrically, using the mandrel itself as one of the electrodes.

Other objects and advantages of my invention will appear as this specification proceeds and the novel features thereof will be fully set forth in the claims hereto appended.

Figure 1:
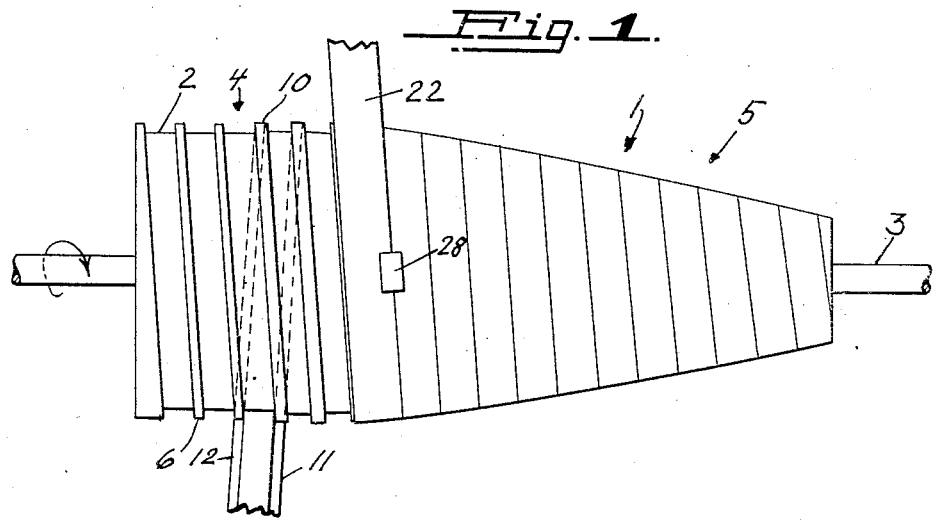
Figure 2:
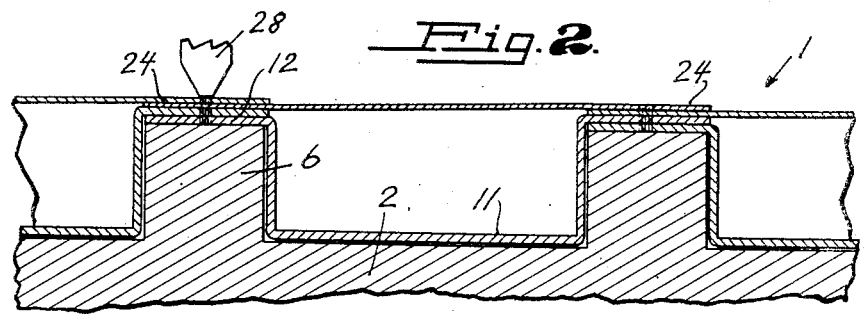
Figure 3:
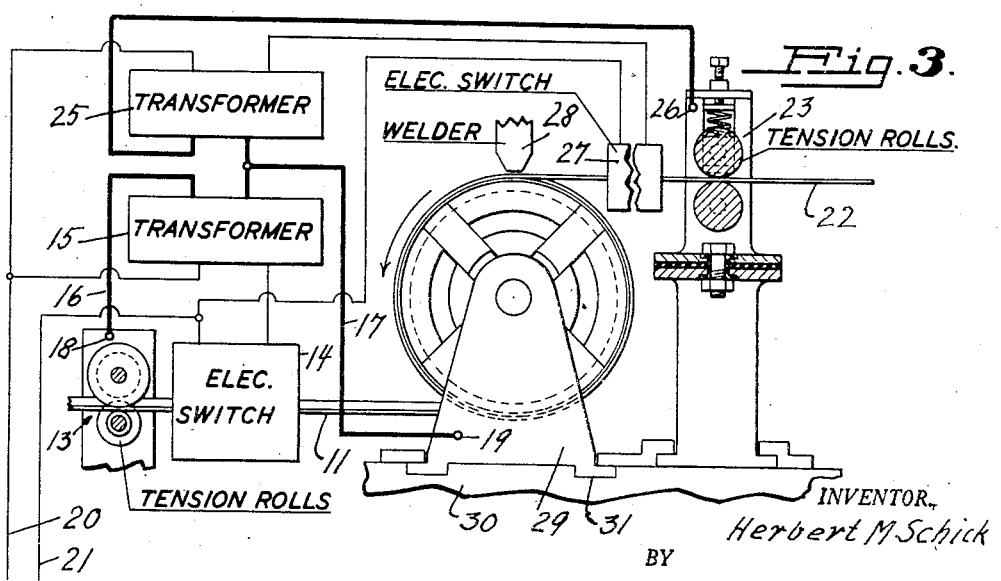

The preferred forms of my invention are illustrated in the accompanying drawings, forming part of this application, in which:

Figure 1 shows a side elevation of a partly completed airplane body in the course of construction;

Figure 2, a fragmentary section through a portion of the airplane body in the course of construction;

Figure 3, a diagrammatic view illustrating the process of manufacture;

Figure 4, a perspective view showing an airplane wing made in accordance with the principles of my invention; and Figure 5, a sectional view explaining the method of manufacture of the front section of said airplane wing.

While I have shown only the preferred forms of my invention, I desire to have it understood that various changes or modifications may be made within the scope of the claims hereto attached, without departing from the spirit of the invention.

Particularly, I wish to call attention to the fact that, while I have described the invention principally in connection with airplanes and their construction, as possibly offering the best field of exploitation at the present time, my invention may be applied in principle to the manufacture of any hollow body of suitable shape, and may be readily applied to the manufacture of ship and motor vehicle bodies and the like.

Referring to the drawings in detail, and particularly to Figures 1 to 3, inclusive, my airplane body indicated at I, is made in a continuous process upon a mandrel 2, supported on a shaft 3, which may be revolved by any suitable means, not shown.

The mandrel conforms in its general shape to that of the body desired, and is here shown as including a cylindrical section 4 and a tapered section 5 adjoining the same. The entire mandrel is provided with a spiral rib 6 projecting from the outside thereof.

In this connection it should be noted that the mandrel is preferably made of copper or some other similar metal of high electrical conductivity, whereas for the body of the airplane, I use a metal of less conductivity or higher resistance, such as stainless steel, steel alloys, or similar material. This allows the mandrel to be used as one of the conductors or electrodes in the heating and welding processes hereinafter referred to.

For the purposes of illustration, the mandrel is shown in the drawings as being made in one piece, but it should be understood that, in actual practice, the mandrel should be made in sections, so as to be collapsible for withdrawal from the completed airplane body, which has been formed thereon.

To form the body on the mandrel, the frame and the shell are successively wound thereon in a continuous operation. The frame structure, which is indicated in its completed stage at 10, is made of a channel-shaped elongated frame element 11, the channel being formed to fit on the mandrel between the ribs and having outwardly extending flanges 12 which overlie the ribs.

To render the channel sufficiently ductile for winding upon the mandrel, I provide suitable means for heating the same prior to its contact with the mandrel. For this purpose I preferably use the electrical system illustrated in Figure 3.

The channel is guided between tension rolls 13, of high conductivity, and through an electrical switch, indicated at 14. The tension rolls and the mandrel serve as terminals or electrodes for the transformer 15, the secondary coil of which is connected, through wires 16 and 17 to the tension rolls, as at 18, and to the mandrel, as at 19. The primary coil of the transformer is connected to the main line wires 20 and 21, one of which passes through the switch 14.

Thus the electrical current is made to pass through that portion of the channel 11 confined between the tension rolls and the mandrel and, since the channel is made of material having greater electric resistance than the mandrel and the tension rolls, this portion of the channel will be heated to the desired temperature for rendering the same sufficiently ductile for the winding operation.

The electrical switch 14 is a heat-responsive control switch of any suitable type well known in the art and its function is to maintain the temperature of the channel constant, turning off the current when the heat rises above a pre-determined point and turning it on when the heat drops below a pre-determined point.

The spiral winding causes the flanges of successive turns to overlap on the ribs 6, as is indicated particularly well in Figure 2, and when the frame structure is completed, it will be a continuous hollow body comprising alternate ridges and depressions.

While the drawing indicates in Figure 2 an overlapping of the flanges 12, similar results may be obtained with the flanges abutting adjacently or even spaced apart, as the purpose of these channels is not to carry the actual structure load of the completed body, but merely to maintain the shell or skin in perfect alinement with its designed shape, the said skin or shell carrying all or the major portion of the structural loads with the channels carrying only component parts thereof.

To this frame structure is applied a shell structure in accordance with the same principle and preferably in the same operation. The shell structure is made of a flat strip of material 22, which is guided through the tension rolls 23 for shaping the same for spiral winding on a part conical and part cylindrical form, and this strip is made to follow the channel in its spiral path. It is sufficiently wide to bridge the channel grooves and to overlap both of the ridges formed by the channel flanges, as shown at 24. The margins of the different turns overlap one another on the ridges of the frame, so that at this point, there are four different thicknesses of material, as indicated in Figure 2.

The strip of material 22 is preferably heated before contacting the mandrel, in the same manner previously described in connection with the channel. For this purpose, I may provide a second transformer 25, the secondary coil of which is connected to the tension rolls, as at 26, and to the mandrel, as at 19, while its primary is controlled by the heat-responsive switch 27.

Instead of causing the margins of the strip to overlap, as at 24, they may, of course, be made to butt, while providing a method of welding the abutting edges into a solid continuous shell and for welding it to the channels in the manner hereinafter described.

The welding is preferably done as part of the same continuous process, by means of any suitable type of electrical spot or seam welding apparatus, indicated at 28. The four overlying thicknesses of material shown at 24, or whatever seams may have been made in the previous operations are welded into a unit while they are on the mandrel, using the latter as one of the electrodes of the welding apparatus.

It is apparent, that in order to effect the spiral winding of the frame and shell strips upon the mandrel, it is necessary that either the feeding devices or the mandrel move endwise, and to indicate this, the frame 29 supporting the mandrel has been shown to be mounted with freedom of endwise movement on the support 30, as shown at 31.

While the continuous winding of the two strips on the mandrel form, is shown and described as the preferred manner of carrying out the underlying idea of my invention, it is apparent that a structurally similar body might be obtained by using spaced circular ribs on the mandrel, and by applying the strips of frame material and shell material individually. The resulting structure would be substantially the same as that shown in Figure 2, but both the frame and the shell would consist of a plurality of overlapping circular rings welded together in the manner above suggested and joined at the ends.

After the end of the mandrel has been reached, or whatever length is desired, the operation is discontinued, and the body is then complete, all of the assembling and welding being done in a single continuous operation.

The mandrel may then be removed, and for this purpose, should be made collapsible, which may be readily accomplished by making the mandrel hollow and in sections with interposed wedges spreading toward the center of the mandrel.

Suitable provision may be made in the mandrel for the insertion of pre-fabricated shapes or sections, which may be assembled integrally with the general assembly heretofore described. Likewise provision may be made for applying previously fabricated shapes or sections to the outer general surface of the finished assembly by the same process of seam or spot welding.

Instead of applying the shell in the form of a strip of material as indicated, it is also possible to pre-form the shell in sections and to apply the sections to the frame structure, with the edges lapped or butted, and welded to the channels as heretofore described. This process may be used in the entire construction or in conjunction with the spiral winding of the shell to accommodate some intricate special forming or to provide for greater strength at certain points of attachment of the portions of the finished mechanism.

In the form shown in Figures 4 and 5, the principles of my invention are applied in connection with the use of an external mandrel, as used for the construction of an airplane wing. The wing is shown in Figure 4 as comprising a shell 35 consisting of a nose plate 36, two intermediate plates 37 and two rear plates 38. The frame comprises a series of channels 39, vertical channels alternating with diagonal ones.

For building a wing of this character, I would use the mandrel 40 illustrated in Figure 5, it being understood that the mandrel would be made of copper or similar material of high conductivity to serve as an electrode for welding operations.

The mandrel comprises a main section 41 having a cavity 42, against which the nose piece 36 of the airplane wing is formed, and a plurality of movable sections 43 acted on by cams 44 to complete the mandrel in successive steps.

In operation, the nose piece 36 is first bent into the cavity 42, as shown in dotted lines, the ends of the piece being made to catch in recesses 45 in the nearest adjacent sections 43. As the latter are pressed inwardly, they force the nose piece into the cavity.

Next the intermediate plates 37 are applied in the manner shown, to provide overlapping edges 46 and a pre-formed channel 47 is positioned, with its flanges registering with the overlapping edges 46.

The flanges and edges may then be spot or seam welded by means of welding apparatus shown at 48, whereupon a second diagonal channel may be applied in a similar manner.

Thus the operation may be continued, the shell sections being urged into their proper places by successive application of the mandrel sections and the channels being inserted in timed succession and being welded thereto, using the mandrel as one of the electrodes.

I claim:

1. The method of forming a rigid airplane body or the like which comprises the steps of spirally winding a continuous flanged metal channel upon a mandrel having a spiral rib, with the flanges forming a seam on the rib, then winding a flat strip of sheet metal to bridge the channel and with margins overlapping on the seam, and electrically welding the overlap to the seam while using the mandrel as one of the electrodes.

2. A rigid body for an airplane or the like comprising a continuous frame structure consisting of a spirally disposed metallic channel having coacting flanges to form a spiral ridge, and a substantially smooth and unbroken shell surrounding the frame structure and consisting of a flat strip of metal arranged spirally upon the ridge so as to bridge the space between the turns of the ridge, the shell being rigidly secured to the ridge.

3. The method of forming a rigid airplane body or the like which comprises the steps of spirally winding a continuous flanged metal channel upon a mandrel having a spiral rib, with the flanges forming a seam on the rib, then winding a flat strip of sheet metal to bridge the channel and with margins overlapping on the seam, and welding the overlap to the seam.

4. The method of forming a rigid airplane body or the like which comprises the steps of spirally winding a continuous flanged metal channel to cause the flanges of each turn to overlap with the flanges of adjacent turns so as to form a continuous seam, then winding a flat strip of sheet metal to bridge the channel and with margins overlapping on the seam, and welding the overlap to the seam.

5. The method of forming a rigid airplane body or the like in a continuous process which comprises the steps of spirally winding a continuous flanged metal channel upon a mandrel of varying cross-section having a spiral rib, with the flanges of the channel forming a seam on the rib, of placing the channel under tension at a point in advance of and spaced from the point of entry upon the mandrel, of uniformly heating the channel between the two points to render the same ductile and to cause the same to conform to the shape of the mandrel, of similarly winding a flat metal strip upon the channel to form a second seam upon the first seam, and of welding the strip to the channel at the seams.

6. The method of forming a rigid airplane body or the like in a continuous process, which comprises the steps of spirally winding a continuous flanged metal channel of low conductivity upon a mandrel of high conductivity and of varying cross-section and having a spiral rib, with the flanges forming a seam on the rib, of placing the channel under tension at a point in advance of and spaced from the point of entry upon the mandrel, of electrically heating the channel between the two points while using the mandrel as an electrode to render the channel ductile and to cause the same to conform to the shape of the mandrel, of similarly winding a flat metallic strip of low conductivity upon the channel to form a second seam upon the first seam, and of electrically welding the strip to the channel at the seams, while using the mandrel as an electrode.

7. The method of making an airplane body or the like in a continuous process which comprises the steps of spirally winding a heated flanged metallic channel upon a mandrel of varying cross-section having a spiral rib, with the flanges forming a seam on the rib, of spirally winding a heated flat metallic strip upon the channel to form a second seam upon the former seam, and of welding the strip upon the channel at the seams.

8. The method of making an airplane body or the like in a continuous process which comprises the steps of spirally winding a heated flanged metallic channel of low conductivity upon a mandrel of high conductivity and of varying cross-section and having a spiral rib, with the flanges forming a seam on the rib, of spirally winding a heated flat metallic strip of low conductivity upon the channel to form a second seam upon the former seam and of electrically welding the strip upon the channel at the seams while using the mandrel as an electrode.

9. A body for an airplane or the like comprising two continuous-spiralled metallic sections of uniformly varying cross-section, one fitting within the other, the first section comprising a continuous spiralled channel and a continuous spiralled rib and the other section being substantially flat and being welded to the rib of the first section.

HERBERT M. SCHICK.